Feb. 7, 1967  J. A. MEANS  3,303,388
SOLID STATE CIRCUIT BREAKER
Filed July 27, 1964  2 Sheets-Sheet 1

INVENTOR.
JAMES A. MEANS
BY *C E Vautrain Jr.* AGENT
*George J. Rubens*
ATTORNEY United States Patent Office 3,303,388
Patented Feb. 7, 1967

3,303,388
SOLID STATE CIRCUIT BREAKER
James A. Means, Camarillo, Calif., assignor to the United States of America as represented by the Secretary of the Navy
Filed July 27, 1964, Ser. No. 385,522
1 Claim. (Cl. 317—33)

The invention described herein may be manufactured and used by or for the Government of the United States of America for governmental purposes without the payment of any royalties thereon or therefor.

This invention relates in general to overload protection for circuits having components susceptible to damage and more particularly to such overload protection for circuits utilizing semi-conductor elements.

It is often necessary in the field of electronics to protect electronic or electrical equipment from overcurrent conditions through the use of a high speed circuit breaker. It is often essential to provide this overcurrent protection within a few microseconds of the occurrence of an overload so as to protect electronic equipment from catastrophic failure. An example of the use of such a protective device is in a circuit used for D.-C. signaling (simplexing) in a communications set. In such use, a short on the output or load line would cause a disastrous failure in the system.

The fuses and mechanical circuit breakers commonly employed in electrical circuits are too slow in reaction and frequently too large to meet the requirements for protection of components in electronic circuits. In addition to fuses and mechanical circuit breakers being too slow to provide the necessary protection, the conventional methods also generally require severe overcurrent conditions to exist before the protection element can be actuated to provide even relatively fast protection.

Those conventional electronic circuit breakers which sense the voltage across the load instead of load current are undesirable in that they may not detect complementing changes in load resistance and load current which can occur without noticeable voltage change. The circuits shown, exemplified or described in the present application sense load current only, not load voltage, and otherwise provide greatly improved overcurrent protection devices which overcome many disadvantages of presently used devices.

Accordingly, it is an object of the present invention to provide overcurrent protection at a well-defined current level within an extremely short period of time.

It is another object of this invention to provide overcurrent protection at a current level or amount which may be adjusted.

It is a further object of the present invention to provide overcurrent protection in the form of a circuit breaker which may be reset manually or by an external trigger pulse and which may be tripped or opened by an external trigger.

It is a still further object of this invention to provide an overcurrent protection device whose speed of response may be reduced to provide predetermined time delays as necessary so as to drive capacitive loads or to permit short term current loads.

It is a still further object of the present invention to provide an overcurrent protection device which is sensitive to current only.

It is a still further object of the invention to provide an overcurrent protection device which is applicable to a broad range of current limit values, from very small load currents of the order of a few milliamperes to very large currents of the order of a few amperes.

Other objects and many of the attendant advantages of this invention will be readily appreciated as the same becomes better understood by reference to the following detailed description when considered in connection with the accompanying drawings in which like numerals designate like parts throughout and wherein.

Generally, the circuit breaker of the present invention includes a series (pass) transistor and a silicon controlled rectifier (SCR). For load currents below the limit value, the SCR remains in the OFF (non-conductive) state and therefore conducts no current. The base current to the transistor under these conditions is supplied in a conventional manner and the transistor, which is in saturation, is conducting the load current. When load currents exceed the preset limit value, the voltage drop across a potentiometer branch will exceed the firing voltage for the SCR and the increased voltage will fire the SCR and cause it to go into the ON (conducting) state. The base current for the transistor now will flow through the SCR and the transistor will be cut off due to lack of base drive. The load current is thus stopped by the transistor which is now cut off.

It is to be expressly understood that other comparable rapid action controlled valves such as, for example, triodes, pentodes, field effect transistors, tetrodes, silicon controlled switches, gate controlled switches, thyratrons and unijunction transistors or the like may be substituted for the control valves of the present invention within the basic concept thereof.

Figure 1:
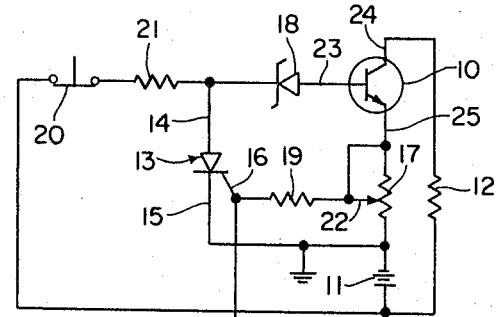
FIG. 1 is a schematic circuit diagram of one embodiment of the high speed circuit breaker of this invention.

Referring to FIG. 1, the solid state circuit breaker shown includes a transistor 10 which is used to switch the supply voltage provided by a D.-C. power source such as battery 11 onto the load which is represented by resistor 12. Transistor 10 is controlled, i.e. made conducting or non-conducting, by controlled rectifier means such as silicon controlled rectifier (SCR) 13 having an anode 14, a cathode 15 and a gate 16. Potentiometer 17 is included in series with the emitter electrode of transistor 10 to sense the magnitude of the load current. Zener diode 18 is placed in series with the base electrode of transistor 10 to prevent even a small load current from flowing after the SCR has fired. A resistor 19 is placed in series with SCR gate 16 to ensure that the value of holding current for the SCR is sufficiently small. A normally closed switch 20, a current limiting resistor 21 and wiper arm 22 of potentiometer 17 complete the circuit components and accessories. For convenience, the base, collector and emitter electrodes of transistor 10 are designated 23, 24 and 25, respectively. An alternate control means is provided for at terminals 26 for the introduction of trigger pulses.

In the normal operation of the circuit of FIG. 1, the base current for transistor 10 flows out of the positive terminal of power supply 11 through normally closed switch 20 and through base biasing resistor 21. The base current proceeds through Zener diode 18 and into base electrode 23 of the transistor. Collector or load current flows out of the positive terminal of the power supply, through the load resistor 12 and into collector electrode 24 of transistor 10. Current flow through the emitter electrode of transistor 10 is the sum of the collector current and the base current and flows from emitter electrode 25 through variable resistor or potentiometer 17 to the negative terminal of power supply 11. When the voltage drop across potentiometer 17 exceeds the gate firing voltage of SCR 13, the SCR will fire, that is, switch to the conducting state. The base current is now diverted from its path through Zener diode 18 and flows through SCR 13 to the negative terminal of the power supply. Cessation of base current causes cessation of collector current thereby cutting off load current to the load or load resistor. At this point, the voltage drop across the anode and cathode of the SCR may be sufficient to cause a small current to flow into the base electrode 23 of the transistor. This small base current would cause a small load current to flow, which would be undesirable. Hence Zener diode 18 has been included to prevent the flow of such small base currents. No current can flow through Zener diode 18 until the voltage thereacross exceeds a predetermined value for which the Zener diode has been chosen, the value being greater than the voltage drop across the SCR so that there now is no current through the Zener diode and no current into the base electrode of transistor 10. Thus, when the SCR is fired due to an overcurrent condition, the base current to transistor 10 ceases and the load current ceases also.

Zener diode 18 may be replaced by one or more seried diodes which would be connected in the forward direction to the base current flow since each of such diodes would have an offset voltage which must be overcome before there could occur a forward conduction of current. Zener diode 18 may also be replaced by a resistor which would limit the base current to a value such that the corresponding small load current would be tolerable. Also, a small supply with a terminal voltage greater than the voltage drop across the SCR may be connected in place of the Zener diode in a direction such that it would oppose the base current.

Base resistor 21, having a value of $R_3$, is included to limit the base current $I_b$ to a desirable value which, for a transistor in saturation, is approximately equal to the value obtained from the expression $$I_b = \frac{(V_1 - V_z)R_L - V_z R_1}{R_3 R_L + R_1 R_3 + R_1 R_L}$$

where:

$V_1$ = the voltage supplied by power supply 11
$R_L$ = the resistance of the load 12
$R_1$ = the resistance of the variable resistor 17
$R_3$ = the resistance of the base resistor 21
$V_z$ = the voltage at which Zener diode 18 will conduct current The value of the holding current for SCR 13 is inversely related to the resistance which appears between its gate lead 16 and its cathode lead 15. As the value of resistor 17 and variable resistor 19 is diminished, the minimum value of the holding current is increased. The value of resistor 19 is so chosen that the available base current is greater than the minimum holding current. If this condition is not met, the circuit will oscillate turning the load on and off repeatedly.

The value of potentiometer resistor 17 is adjusted through wiper arm 22 until the SCR fires (begins conducting) at the desired value of load current. Increasing the potentiometer resistance causes the SCR to fire for smaller values of current and vice versa. Normally closed switch 20 may be used as a manual reset for the circuit breaker. When switch 20 opens, the current path for the SCR is interrupted and the SCR is reset. When switch 20 is reclosed, the base current is again directed into the base electrode 23 of transistor 10 permitting the load current to flow again. However, if the load current rises above the limit value, the SCR simply fires again resulting in load current interruption. Therefore, an attempt to reset the high speed circuit breaker when the load has not been corrected causes no damage or difficulty.

The circuit may also be reset by any of several methods which cause the current through the SCR to fall below the required value of holding current. Such resetting may be accomplished by (1) reducing the value of the power supply voltage a predetermined amount, (2) shorting across the anode of SCR 13 and the negative terminal of the power supply with a switch which may be either manual or electronic, (3) shorting the gate lead 16 to the negative terminal of power supply 11 with a switch which may be either manual or electronic, and (4) injecting a pulse through terimnals 26 onto the gate 16 of the SCR which is sufficiently negative going with respect to the cathode 15. The circuit of this embodiment also may be caused to trip by a trigger pulse, which pulse should be sufficiently positive going and applied between the gate 16 to the SCR and cathode 15 to cause the SCR to fire thereby interrupting the load current.

The following circuit values for the embodiment of FIG. 1 are given by way of example only, and it is to be understood that the actual circuit values may vary according to the design for any particular application:

| | |
|---|---|
| Battery 11, volts | 48 |
| Transistor 10 | 2N2102 |
| Silicon controlled rectifier 13 | 2N2322 |
| Resistor 17, ohms variable | 50 |
| Resistor 19, ohms | 1K |
| Resistor 21, ohms | 6.8K |
| Zener diode | 1N746 |

Figure 2:
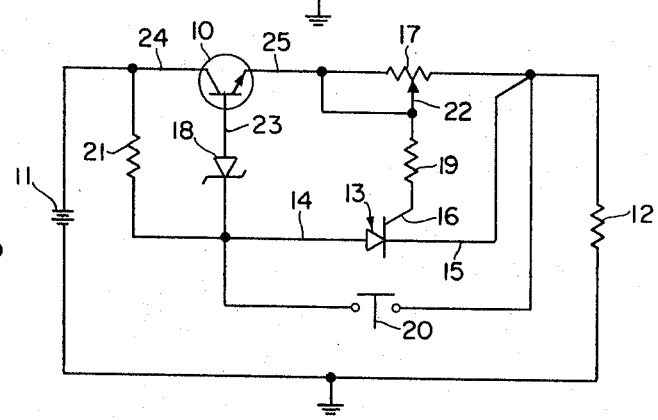
FIG. 2 is a schematic circuit diagram of a second embodiment of the high speed circuit breaker of the present invention.

In the embodiment of FIG. 2, load resistor 12 is placed in the emitter circuit of transistor 10 and the base current is supplied from power supply 11 through resistor 21 and Zener diode 18 to the base electrode 23 of transistor 10. When the voltage between the gate 16 to the SCR and the cathode 15 of the SCR exceeds the gate firing voltage for the SCR, the SCR fires. Current now flows through the SCR from anode to cathode and since no current is supplied to the base electrode of transistor 10 the collector current ceases. The load current is thus reduced to the small current value flowing through the SCR. The circuit of FIG. 2 may be triggered and reset by the same methods as applied in the case of the circuit of FIG. 1. After the circuit breaker has been tripped due to an overcurrent condition a small current still will flow in the load and may be undesired in some applications. In the circuit of FIG. 2, however, it is impossible to saturate the transistor 10 and hence the voltage drop across the emitter and collector electrodes of the transistor is larger than for the circuit of FIG. 1. This larger voltage drop is advantageous because a saturated transistor is slower to turn off than one that is not saturated. Hence, where speed of circuit break is the primary goal, the circuit of FIG. 2 may be preferred over the circuit of FIG. 1. The FIG. 2 circuit has the added feature of requiring less breakover voltage for the SCR, and since the cost of SCR's increases as does their breakover voltage, the circuit of FIG. 2 is available at a less cost than that of FIG. 1. The larger voltage drop also results in more power being consumed by the pass transistor and in a reduced load voltage from the same power supply.

Figure 3:
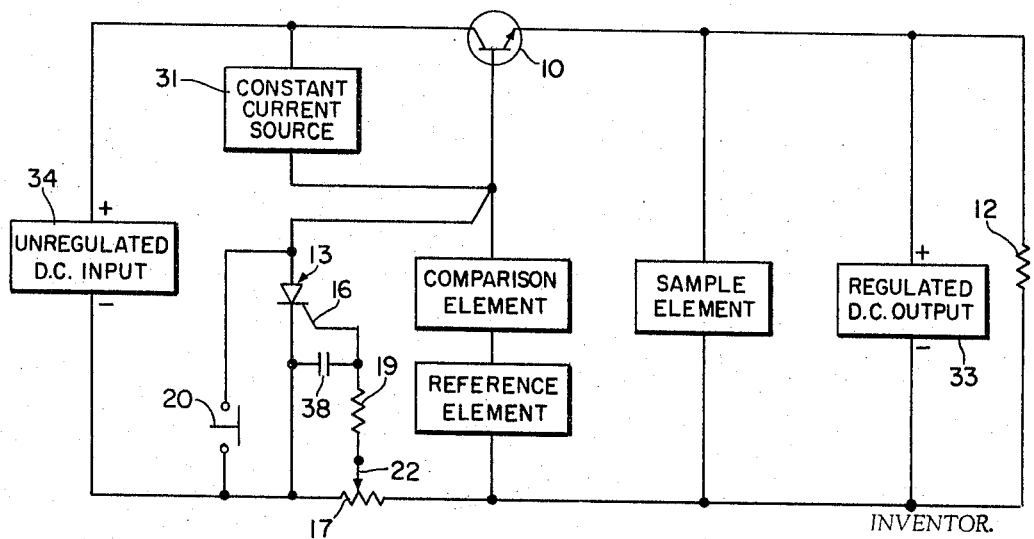
FIG. 3 is a schematic circuit and block diagram of a third embodiment of the present invention.

The schematic and block diagram of FIG. 3 illustrates the application of the high speed circuit breaker of the present invention to a conventional series electronic voltage regulator. The base current for the pass transistor is generally supplied from a constant current source 31 which delivers a constant value of current. The regulator allows just enough load current to flow so that the output voltage remains constant. The load current follows a return path from the negative terminal of a regulator D.-C. output voltage 33 through potentiometer 17 to the negative terminal of an unregulated D.-C. input voltage source 34. The voltage across the potentiometer resistance to the left of the potentiometer pointer increases as the load current increases, and when this voltage exceeds the gate firing voltage for the SCR, the SCR switches to the conducting state. The total current from the current source then will flow through the SCR therefore causing no base current to the transistor 10 and thus terminating the load current.

The electronic circuit breaker of the present invention will generally not degrade the performance of a conventional electronic voltage regulator when connected in a regulator circuit as shown in FIG. 3. The value of current from the constant current source must be larger than the holding current of the SCR for a particular value of resistance between gate and cathode. Reset may be accomplished by using a normally open switch 20 which when closed causes current to pass the SCR. This reduces the current through the SCR below the holding value and consequently the SCR resets. The methods of triggering and reset described in connection with the embodiment of FIG. 1 may be used with this circuit also.

Figure 4:
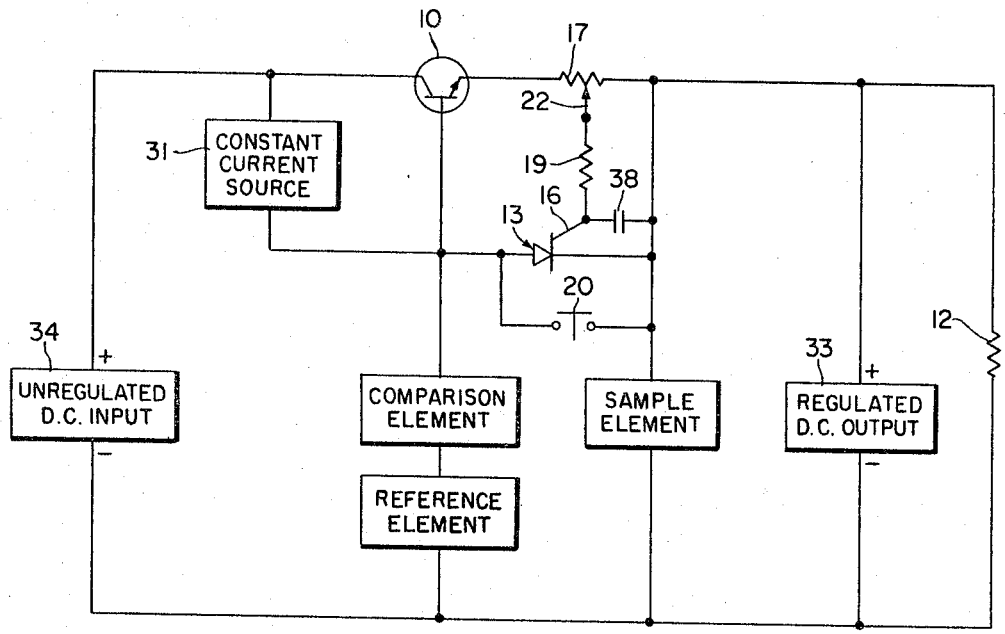
FIG. 4 is a schematic circuit and block diagram of a fourth embodiment of the invention.
Figure 5:
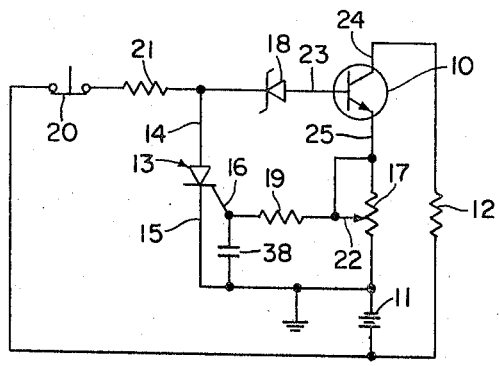
FIG. 5 is a schematic circuit diagram of a fifth embodiment of the invention which increases the operating time of the high speed circuit breaker.

FIG. 4 is an alternate embodiment of that shown in FIG. 3 and permits the use of an SCR which has a lower forward breakover voltage than may be permitted with the SCR in FIG. 3. Operation is the same as described for the embodiment of FIG. 3. The voltage across the base of transistor 10 and the positive terminal of regulated D.-C. output 33, which is also across the SCR, is very small in this embodiment since it is only the small base to emitter drop of the transistor. The load current which passes through the potentiometer develops a voltage across the portion thereof between the pointer and the regulated D.-C., output which will fire the SCR when the load current exceeds the limit value. Once the SCR has fired, all of the current passes through the SCR thereby reducing the base current to zero. The load current is then reduced to a very small value of current from the constant current source 31. The circuit of FIG. 4 operates the same as was described for the circuit of FIG. 3, and the FIG. 4 circuit may be reset or fired in the various ways described for the embodiment of FIG. 1. FIG. 5 is a modification of the circuit of FIG. 1 which may be used for applications requiring longer operating times. The additional capacitor 38 serves to reduce the rise time of the voltage appearing between the gate lead 16 and the cathode lead to the SCR. The time constant for this voltage rise is essentially the product of the capacitance times the sum of resistance 17 and 19. If a step function of voltage between the pointer of the potentiometer and the negative terminal of the power supply of a value sufficient to fire the SCR suddenly appears across the potentiometer resistance 17, the voltage between the gate 16 and the cathode 15 of the SCR does not instantaneously rise to its full value but rises toward this value with the time constant. The time delay gained by using capacitor 38 permits a delay before triggering the SCR so that the circuit can supply capacitive loads or short duration of overloads of current.

The electronic circuit breaker of the present invention may be utilized wherever protection from overcurrent conditions is deemed necessary. Some examples of application are: protection of direct current power supplies from overcurrent conditions such as short circuits or load changes, protection of simplexing or direct current signalling circuits from overcurrent conditions such as shorted lines, protection of direct current transmission lines from overcurrent conditions which might result from shorted lines or voltage increases, protection of amplifier output stages from overcurrent conditions which might result from no load operation, protection of ammeters from overcurrent conditions, protection of direct current electric motors from overcurrent conditions which might result from excessive torque requirements or overvoltage conditions, protection of direct current generators from overcurrent conditions which might result from excessive loads and protection of vacuum tubes from overcurrent conditions which might result from the loss of bias.

Among the advantages of the circuit breaker of this invention are: extremely fast action which renders the invention distinctly superior to fuses and thermal or magnetic circuit breakers for requirements demanding rapid action, capability of being reset manually or electronically which makes it superior to fuses and thermal or magnetic circuit breakers in this respect, adjustability in that the limit values may be varied thus providing another feature not offered by fuses and most thermal and magnetic circuit breakers, absence of moving parts which results in a much greater lifetime than that of conventional circuit breakers, a sensitivity to current only thereby presenting a definite advantage over other electronic circuit breakers which in reality sense voltage rather than current, capability of being tripped electronically by a trigger pulse thus providing for remote control and capability of being slowed down to predetermined time delays thereby permitting the driving of short term overloads. The electronic circuit breaker of the present invention is susceptible to a substitution of circuit parameters over a broad range of limit values, with proper component selection, which is a decided advantage over other electronic circuit breakers whose use is restricted to low current levels only.

It will be recognized that many modifications and variations of the present invention are possible in the light of the above teachings. It is therefore to be understood that within the scope of the appended claim the invention may be practiced otherwise than as specifically described.

I claim:

An overcurrent protection device responsive to load current comprising:

a transistor having a base electrode, an emitter electrode and a collector electrode;

a current source for providing base current to the base electrode of the transistor when the local current flowing through the collector electrode and the emitter electrode is within allowable values;

a variable potentiometer connected in series with the emitter electrode of the transistor for sensing the magnitude of the load current flowing therethrough;

a silicon controlled rectifier connected in series with the current source and the base electrode of the transistor, with its anode electrode coupled with the base electrode of the transistor to divert current therefrom when an excessive current flows through the potentiometer with its cathode electrode coupled with the current source and with its gate electrode coupled with the variable potentiometer to render the silicon controlled rectifier current conducting upon the occurrence of an overcurrent condition;

a Zener diode connected in series with the base electrode of the transistor and the anode electrode of the silicon controlled rectifier for substantially eliminating current flow through the base electrode of the transistor when the silicon controlled rectifier is conducting current;

a capacitor coupling the gate and the cathode electrodes of the silicon controlled rectifier to permit short term overcurrents to flow; and an open switch connected in parallel across the silicon controlled rectifier for diverting current from the base electrode of the transistor and the silicon controlled rectifier to permit reset of the circuit of the device;

whereby excessive current flow through the collector and emitter electrodes of the transistor cause the gate electrode of the silicon controlled rectifier to render the rectifier current conducting and render the transistor nonconducting to thus stop the flow of load current.

References Cited by the Examiner

UNITED STATES PATENTS 3,192,441   6/1965   Wright _____ 317—33
3,218,542   11/1965  Taylor.

MILTON O. HIRSHFIELD, *Primary Examiner.*

J. D. TRAMMELL, *Assistant Examiner.*